F. S. DICKINSON.
METHOD OF CONSTRUCTING PNEUMATIC TIRES.
APPLICATION FILED OCT. 11, 1912.
1,115,409.
Patented Oct. 27, 1914.
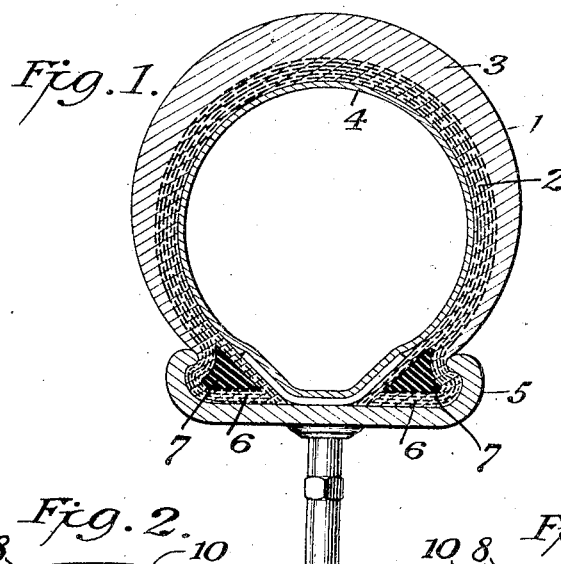
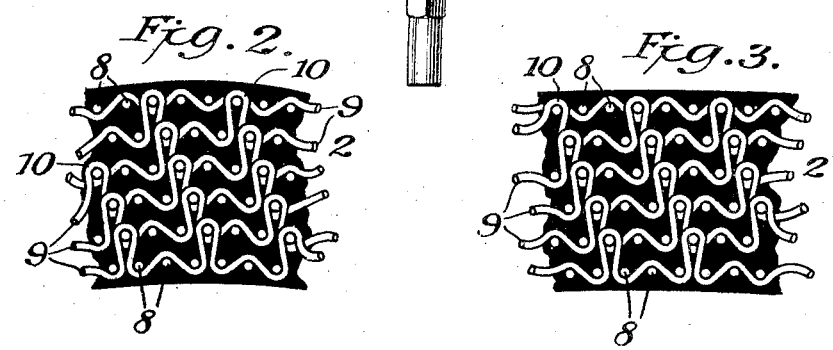
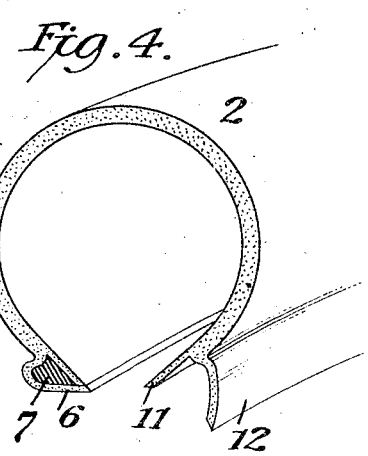
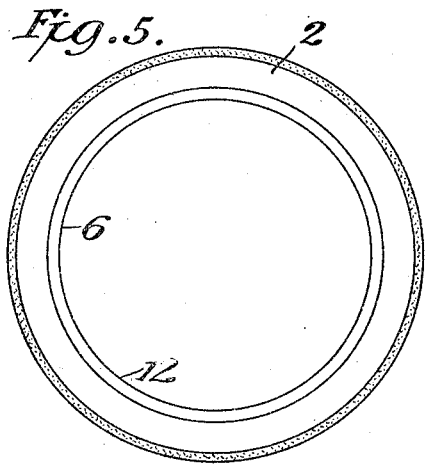
Witnesses:
Inventor: Frederick S. Dickinson
By his Attorney

UNITED STATES PATENT OFFICE.

FREDERICK S. DICKINSON, OF NEW YORK, N. Y.

METHOD OF CONSTRUCTING PNEUMATIC TIRES.

1,115,409.

Specification of Letters Patent. Patented Oct. 27, 1914.

Application filed October 11, 1912. Serial No. 725,246.

*To all whom it may concern:*

Be it known that I, FREDERICK S. DICKINSON, a citizen of the United States, and resident of New York, in the county and State of New York, have invented certain new and useful Improvements in Methods of Constructing Pneumatic Tires, of which the following is a specification.

This invention relates to methods of constructing pneumatic tires such as are now commonly used upon automobiles and other vehicles, and my improvements have particular relation to the elastic shoe or casing which constitutes the outer portion and tread of the tire and incloses the inner air tube. Such shoes or casings comprise a body constituted by layers of textile fabric held in cohesion by caoutchouc or rubber and carrying an external portion constituting the tread. In the method of constructing such tire casings, as heretofore employed, the fabric body has been built up from a plurality of separate layers or plies of textile fabric, to produce the required thickness, each layer being made up of separate strips spliced together at lap joints. The fabric adapted for the purpose is woven with warp and woof threads in straight lines, and owing to its limitations in standard width it has been necessary to cut on the bias to produce the required length of strips which are lapped and spliced together at their ends to form the individual layers or plies from which the body fabric of the tire casing is built up. The separate fabric layers of lapped and joined strips have been built up in laminated or superposed order to produce the desired body thickness of fabric.

The employment of lapped and spliced joints in the fabric layers, and the employment of separate layers of fabric, in the tire casings as now generally constructed, is open to many disadvantages. The construction is expensive and requires much time and labor, and the lapped joints produce a point of extreme weakness at which "blow-outs" usually occur, this being due to the excess thickness and strength at such joint-lap, which prevents the uniform absorption of the "shuffling" action of the separate strands throughout the entire body of the fabric under the elastic action of the tire when in use and abruptly checks the same at the line of such joint, thus causing a "sawing" action between the strands and resulting in a break at the line of the joint.

A further difficulty is encountered in uniting the separate superposed layers or plies of fabrics at all points over their respective surfaces. In the prior method of construction, as above set forth, caoutchouc or rubber is applied between the separate fabric layers to secure cohesion in the body fabric, and this has been accomplished by pressing the rubber upon the surface of the fabric layer as it is passed through calender rolls. The greater pressure necessarily applied in the rolls tends to flatten out the threads of the closely-woven fabric, thus closing the open mesh and precluding the entrance of the rubber within the mesh. It is desirable to impregnate the mesh of the fabric with the friction rubber, but the mere skin coating resulting from the application of the rubber by calender rolls does not penetrate the pores or mesh of the fabric and forms only a cohesive bond between the surfaces of the separate layers of fabric. Consequently, the threads or strands of the respective layers of fabric are subject to a "sawing" movement under the elastic action of the tire, which materially reduces durability. Furthermore, the requisite high compression upon the fabric in the calender rolls fractures or impairs the overlapping threads or strands, thus initially causing points of weakness and a high percentage of loss in the effective service or life of the tire. In the prior method of construction, in which the fabric body of the tire casing is built up from separate layers of fabric, the fabric must be stretched or distorted to produce the required curvatures in the shape or contour of the segmental cross-section and annular or ring form of the complete shoe or casing, and this stretching or distortion further weakens any distended threads or strands and produces inequalities under which the non-uniformity in the torsional status and structural condition of the different strands, some being distended and others highly compressed, permits of a greater degree of "shuffling" movement of the strands and a tendency to work upon each other with a "sawing" action when the tire is in use, which action of the strands is transmitted from layer to layer and ultimately causes a break through the entire body fabric, this being another frequent cause of "blowouts." Furthermore, under the method of building up the body fabric from separate layers of superposed or laminated fabric, uniformity of torsion does not exist throughout the body fabric, as the torsional strength will vary in the different layers, and thus air pockets are produced and establish an area at which there is no bond between the separate layers. These air pockets cause wrinkles forming ridges bearing against the next layer and result in the gradual separation of the different layers and consequent material reduction in durability.

The object of my improved method of constructing the casings of pneumatic tires is to overcome all of the conditions and disadvantages above set forth and to produce a simple and improved shoe or casing which will possess maximum advantages in point of uniformity throughout the body fabric, strength, durability, and general efficiency.

A further object of my improved method is to simplify and effect economy in the manufacture of the tire casing.

To these ends, the improved method consists in weaving or constructing the body fabric in a unitary endless fabric conforming to the shape or contour of the annular and segmental cross-section body of the casing, and with the plurality of layers or plies of the fabric interwoven or directly connected, and the method further comprises the impregnation of said unitary endless textile body fabric with caoutchouc or rubber by a vacuum process or under conditions in which the textile fabric is not subjected to pressure, whereby the caoutchouc will impregnate the entire unitary fabric between each ply and between all the threads or strands and in all the spaces of the fabric mesh and produce a homogeneous textile and caoutchouc body, substantially as hereinafter described and particularly pointed out in the claims.

In the drawings, I have illustrated a pneumatic tire of a type to which my improvements relate and have shown a casing as constructed according to my improved method and embodied in such tire.

In the illustration—Figure 1 is a cross-section through a pneumatic tire of a type to which my improved method of constructing the shoe or casing relates. Fig. 2 is a detail section, on an enlarged or magnified scale, on a plane transverse of one form of the body fabric as constructed according to my improved method. Fig. 3 is a detail section corresponding to Fig. 2, on a plane longitudinal of the body fabric. Fig. 4 is an outline view, showing a transverse cross-section of the body fabric and a part of the longitudinal extent thereof in perspective, as said fabric is finished according to my improved method and ready for assembling in the tire construction. Fig. 5 is an outline view illustrating a longitudinal section of the body fabric of the form shown in Fig. 4 as completed in endless annular or ring contour and ready for assembling in the tire construction.

Corresponding parts in all the figures are denoted by the same reference characters.

Referring to the drawings, 1 designates the tire shoe or casing, which comprises the fabric body, 2, and elastic external portion constituting the tread, 3, which casing incloses the inner air tube, 4, and is held in connection with the wheel rim, 5. I have herein illustrated a "clencher" tire, which is one of the types to which the unitary body fabric constructed according to my improved method is adapted, and in this type the casing has the terminal edge or base portions, 6, of its segmental cross-sectional contour clenched within the edge flanges of the rim 5, said portions 6 conforming to the internal contour of the rim 5 and being for this purpose enlarged by separation of the layers or plies of the body fabric to form a pocket within which is inclosed a continuous strip of hard rubber, as at 7.

In the method of constructing the body fabric 2, as comprised in my present improvements, the fabric is woven or constructed as a unitary endless textile body fabric conforming to the annular and segmental cross-section shape of contour of the shoe or casing and with a plurality of superposed layers or plies which are interwoven or directly connected together. I have herein illustrated one preferred form of such unitary multiple-ply body fabric as produced by my improved method of construction, in which each layer or ply is composed of interwoven warp and woof threads or strands, 8 and 9, such strands of the respective layers or plies being at different points or intervals interwoven with the threads or strands of the next adjoining layer or ply, as at 10, whereby all the layers or plies are connected in a homogeneous unitary body fabric. But it will be understood that the details of weaving the unitary multiple-ply body fabric produced under my improved method may be varied to produce any other adapted weave or construction embodying the essential features as herein set forth; for instance, the unitary body fabric may be constructed with a supplementary weave connecting the respective layers or plies, or the latter may be connected by tying the threads or strands of adjoining plies together, or by any textile construction in which the respective layers or plies are directly connected in a unitary endless body fabric.

Preferably, in the organization of the unitary multiple-ply body fabric as constructed under my improved method, the warp and woof threads extend in straight lines transversely and longitudinally of the tire casing, as herein shown, which condition affords greater strength than when the threads extend on the bias as in the construction heretofore employed in which the layers or plies of the body fabric are pieced from strips cut on the bias from a piece of straight-woven fabric.

The body fabric, having the characteristics above described, as produced by my improved method of construction, affords uniform conditions and a uniform torsional status throughout the entire unitary fabric and obviates all the disadvantages and loss of effective service which result from the pieced separate-layer method of construction heretofore employed, as hereinbefore set forth, and the unitary body fabric produced by my improved method is adapted for effective impregnation as a whole or unit with caoutchouc or rubber without subjection to high pressures to apply cohesive skin coatings, as in calender rolls, and thus precludes stretching or distortion of any of the threads or strands. The obviation of the application of high pressure, as heretofore required in the method of constructing the body fabric of tire casing, also enables the thorough impregnation of the unitary multiple-ply body fabric with caoutchouc or rubber at all points within the mesh of the respective connected layers or plies and between the threads or strands thereof as well as at all points between the layers or plies, as illustrated in Figs. 2 and 3, thus producing a uniform homogeneous body combining the textile layers or plies and the caoutchouc filling.

In my improved method of constructing the body fabric, the complete textile fabric body is impregnated with caoutchouc or rubber, to thoroughly combine the textile and caoutchouc filler, and the homogeneous impregnation of all parts of the body fabric without the application of pressure is enabled by the unitary multiple-ply construction of the body fabric as produced by the first step of the improved method.

The homogeneous impregnation of the unitary multiple-ply body fabric is preferably effected by any of the well-known vacuum processes, which exclude all air and dry out all moisture, and in this preferred employment of the vacuum process of impregnation it is simple necessary to subject the complete unitary tire-casing body fabric to the application of the caoutchouc filler in vacuum, whereby a thorough and effective cohesion of the respective connected layers or plies and of each thread or strand of the unitary fabric is secured without the distortion or stretching or deterioration of the fabric such as necessarily results from the application of high pressures. But it will be understood that this step of my method, whereby the unitary body fabric is homogeneously impregnated, may be effected in any suitable or adapted manner, to thoroughly combine the textile and caoutchouc filler to produce the homogeneous tire-casing body fabric. For instance, the threads or strands may be saturated with caoutchouc or rubber before being woven into the unitary multiple-ply body fabric, and under the vulcanization to which such body fabrics thereafter are subjected the heat of the vulcanizing process will cause the caoutchouc carried by the woven threads or strands to mold into all parts of the mesh of the respective plies and between the strands and between the plies and thus produce the homogeneous textile and caoutchouc body. It will be understood, in this connection, that under the high pressure calender rolls application of the rubber to separate layers or plies of body fabric, as in the previous method of construction hereinbefore referred to, air and moisture are not thoroughly excluded, and therefore in the subsequent process of vulcanizing under high heat the air or moisture in the fabric body forms pockets and thus precludes proper cohesion between the layers or plies and rubber at all surface points, whereas under my improved method of construction the adaptability of the unitary multiple-ply body fabric, as produced thereby, to a vacuum process of impregnation, thoroughly eliminates the presence of air or moisture at any point in the homogeneous body prior to the process of vulcanization.

After the unitary endless multiple-ply textile body fabric is produced and thoroughly impregnated with a caoutchouc filler to produce a uniform homogeneous textile and caoutchouc body, under my improved method of contruction, the complete carcass body for the tire casing thus formed is subjected to the usual vulcanizing process and embodied in the usual manner with the external portion constituting the tread, to produce the complete tire shoe or casing.

The general details of construction of the unitary body fabric as produced by my improved method of construction may be varied as desired with reference to the type of tire to which the improvements are applied. If a "clencher" type of shoe or casing is employed, as herein illustrated, the base edge portions 6 of the unitary endless body fabric are interwoven with the main segmental cross-section body, in like manner and preferably with a lesser number of connected layers or plies, to form the continuous inner wall or extension, as at 11, of the base socket, and to form a continuous flap or extension, as at 12, which is adapted to be folded inwardly, after the rubber core 7 has been seated in position between the wall or extension 11 and said flap or extension 12, to form the bottom wall of the base socket, and have its terminal edge connected in the usual manner with the edge of the wall or extension 11, as illustrated in Figs. 4 and 5.

I do not desire to be understood as limiting myself to the detail features of the method of construction as herein illustrated and described, as it is manifest that variations therein may be resorted to in the adaptation of the method of construction to varying conditions according to the type of pneumatic tire casing to which the unitary multiple-ply body fabric is to be applied, without departing from the spirit and scope of my invention and improvements. I therefore reserve the right to all such variations and modifications as properly fall within the scope of my invention and the terms of the following claims.

Having thus described my invention, I claim and desire to secure by Letters Patent:

1. The method of constructing the internal textile body fabric or carcass for the shoe or casing of pneumatic tires, which consists in weaving the body of said carcass initially in the contour of an endless annular and segmental cross-section ring conforming to the contour of the elastic body of the shoe or casing within which it is to be embedded, with all its threads or strands initially in normal relationship to said body contour, and then impregnating said textile body unit while in its initial normal contour and with all its threads or strands in normal relationship thereto with a caoutchouc filler without distortion of any part of its initial woven body contour and without stretching or distortion of any of its threads or strands.

2. The method of constructing a shoe or casing for pneumatic tires, which consists in weaving the textile body fabric or carcass initially in the normal contour of an endless annular and segmental cross-section ring conforming to the contour of the elastic body of the shoe or casing within which it is to be embedded, with all its threads or strands initially in normal relationship to said body contour, and as a homogeneous textile unit in normal condition for placement in association with the elastic body of the shoe or casing, and uniting said textile body unit with the elastic body of the shoe or casing structure without distortion of any part of its initial woven normal body contour and without stretching or distortion of any of its threads or strands.

3. The method of constructing a shoe or casing for pneumatic tires, which consists in weaving the textile body fabric or carcass initially in the contour of an endless annular and segmental cross-section ring conforming to the contour of the elastic body of the shoe or casing within which it is to be embedded, with all its threads or strands initially in normal relationship to said body contour, then applying to said textile body unit while in its initial normal contour and with all its threads or strands in normal relationship thereto a caoutchouc filler, and then uniting said homogeneous textile and caoutchouc body carcass with the elastic body of the shoe or casing structure without distortion of any part of its initial woven body contour and without stretching or distortion of any of its threads or strands.

In witness whereof I have signed my name in the presence of the subscribing witnesses.

FREDERICK S. DICKINSON.

Witnesses:
ARTHUR B. KELLY.
JOS. REED LITTELL.